INVENTORS
ROBERT P. MacKENZIE
WILLIAM D. WORRELL
BY
*Donald P. Schrecki*
ATTORNEY

United States Patent Office 3,416,131
Patented Dec. 10, 1968

3,416,131
TRANSISTORIZED ELECTROLYTE LEVEL INDICATOR
Robert P. MacKenzie, Muncie, and William D. Worrell, Anderson, Ind., assignors to General Motors Corporation, Detroit, Mich., a corporation of Delaware
Filed Jan. 13, 1965, Ser. No. 425,153
6 Claims. (Cl. 340—59)

ABSTRACT OF THE DISCLOSURE

A transistorized electrolyte level indicator for indicating that the electrolyte of a wet cell battery has fallen below an acceptable minimum. The un-grounded battery terminal is connected to the power terminal of a switch having a movable contact engageable with associated accessory and ignition terminals in one position and only the ignition terminal in another position. The emitter-collector electrodes of a control transistor are connected across the accessory terminal and ground and the base electrode thereof is connected to an electrical probe extending through one battery cap with the tip located a distance above the battery plates equal to the minimum acceptable electrolyte level. The emitter-collector electrodes of a switching transistor and the filament of an electric indicating lamp are connected in series across the ignition terminal and ground and the base thereof is connected to the collector electrode of the control transistor. With the electrolyte of sufficient level to engage the probe, the control transistor is conductive to maintain the switching transistor non-conductive. When the electrolyte level falls below the tip of the probe, the control transistor goes nonconductive to trigger the switching transistor conductive to energize the indicating lamp.

---

This invention relates to indicating devices and more particularly to a battery electrolyte level indicator.

The placing of batteries in automobiles due to the design thereof makes the battery inaccessible and sometimes inconvenient to periodically check. For this reason, vehicle owners become negligent and allow the electrolyte level in the battery in their vehicle to be lowered to a depth allowing plates disposed in the battery to be exposed. This causes a quicker deterioration of the battery than is normal and, hence, the need exists for a device to warn a vehicle operator of a battery condition. This device must be able to monitor the level of the electrolyte in a battery that is inaccessibly placed and inform the vehicle operator in the driving compartment of a low electrolyte level.

It is an object of the present invention to provide an improved fluid level indicator that utilizes a conductive fluid as a portion of an indicating circuit.

It is another object of the present invention to provide an improved electrolyte level indicator for a storage battery which utilizes very little current for its operation.

It is still another object of the present invention to provide an improved electrolyte level indicator for a storage battery that has transistorized control circuits.

It is a further object of the present invention to provide an electrolyte level indicator for a vehicle storage battery which is energizable by the ignition switch of the vehicle and which utilizes low current transistorized circuits for providing indication of the electrolyte level.

It is still a further object of the present invention to provide an improved electrolyte level indicator for a vehicle storage battery that is not susceptible to sloshing of the electrolyte to provide false indications of the electrolyte level and which has a normally dark lamp that can be tested for operability by use of the ignition switch.

Further objects and advantages of the present invention will be apparent from the following description, reference being had to the accompanying drawings wherein a preferred embodiment of the present invention is clearly shown.

Figure 1:
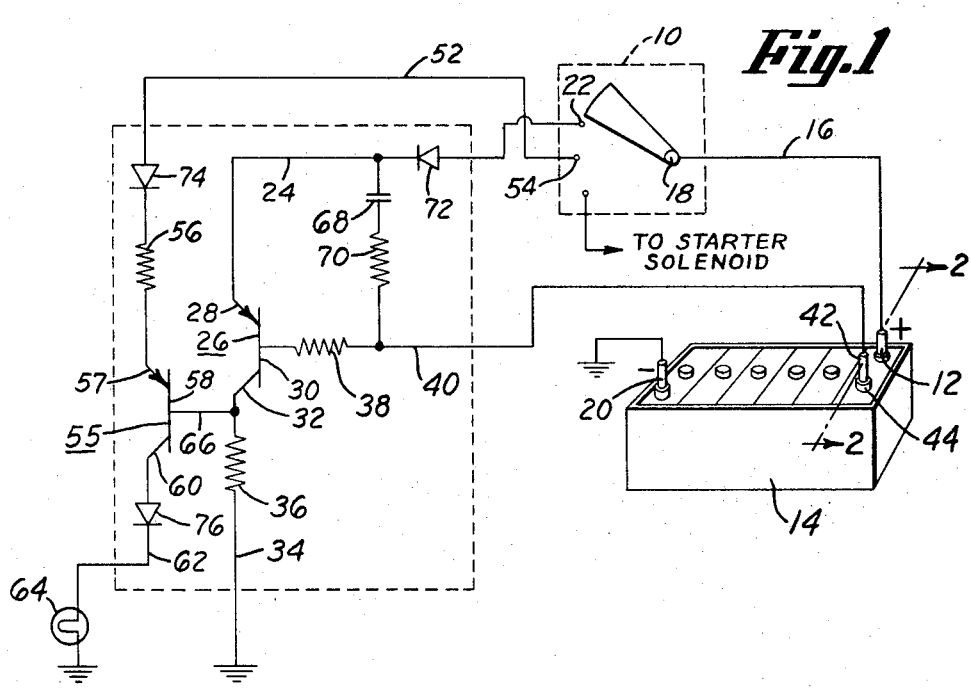
FIGURE 1 is a diagrammatic showing of a typical electrical circuit of this invention adapted to measure the electrolyte level in a cell of the battery.

The system illustrated in this invention operates through an ignition switch, generally designated by the numeral 10, so that there is no drain on the battery when the vehicle is not being operated. The ignition switch 10 is connected to a terminal 12 of a battery 14 through a lead 16 to a switch battery terminal 18. The battery 14 is grounded through a terminal 20.

The ignition switch 10 includes an accessory terminal 22 engaging a lead 24 to a first transistor 26. Transistor 26 includes an emitter 28, a base 30 and a collector 32, the collector 32 being grounded by a lead 34 through a resistor 36. The base 30 of the transistor 26 is loaded by a resistor 38 in a line 40 to a probe 42.

Figure 2:
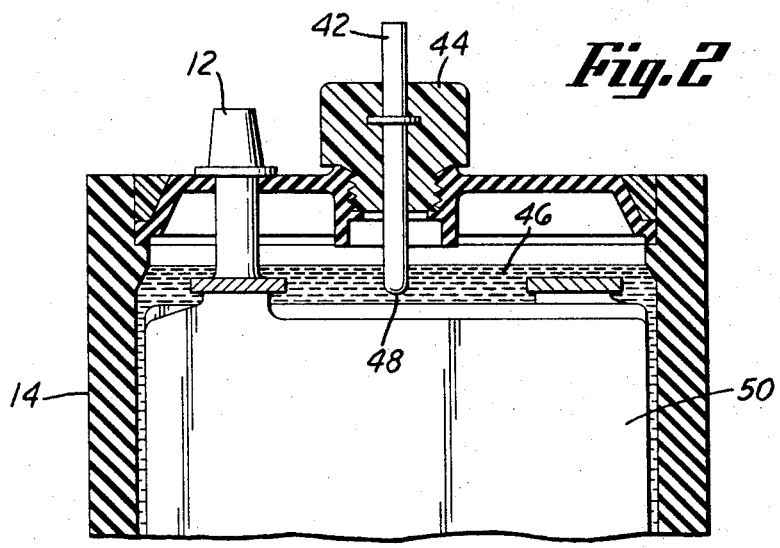
FIGURE 2 is a sectional view taken along line 2—2 of FIGURE 1.

Referring to FIGURE 2, the probe 42 is illustrated as being carried by a battery filler cap 44 with the probe extending through the filler cap 44 into an electrolyte 46 with the tip 48 of the probe 42 representing a level in the electrolyte 46 deemed to be the minimum acceptable electrolyte level. The tip 48 of the probe 42 is preferably disposed at a level wherein the plates 50 in the battery 14 are not exposed above an electrolyte having the same level.

It is clear then from an examination of FIGURE 1 that a circuit is established between the terminal 12 of the battery 14 through the ignition switch 10 and the transistor 26 to ground, and another circuit to bias the base 30 of the transistor 26 is established through the probe 42, being grounded through the battery in a conventional manner. Therefore, the electrolyte 46 in the battery 14 is utilized as a conductive path for a circuit to the base 30 of the transistor 26. These two circuits, as just described, are sometimes referred to herein as the first control means or as first means for controlling current flow.

Another circuit sometimes referred to herein as the second control means is established by a lead 52 connected to an ignition terminal 54 of the ignition switch 10 and provides a voltage potential to a second transistor 55 through a resistor 56. The transistor 55 is normally non-conducting due to the voltage drop across the resistor 56 when the transistor 26 is conducting. The transistor 55 includes an emitter 57, a base 58 and a collector 60. The collector 60 engages a lead 62 to a grounded lamp 64. A lead 66 conductively engages the collector 32 of the first transistor and the base 58 of the second transistor. The circuit is designed so that the potential at the collector of the first transistor and, consequently, the base of the second transistor is greater than at the emitter of the second transistor due to the voltage drop across resistor 56. For this reason, the second transistor is non-conductive when the first transistor is conducting.

A capacitor 68 in series with a resistor 70 is provided between the lead 24 and the lead 40 in order to provide a two to three second delay in the blocking of the first transistor when the probe 42 becomes suspended above the electrolyte in the battery 14. This can occur due to sloshing of the electrolyte when the vehicle passes over rough roads. Diodes 72 and 74 are provided in the first and second control means respectively in order to prevent the transient currents sometimes present in automobile electrical systems from adversely affecting the operation of the transistor 26 and 55. The diode 76 is provided between the lamp 64 and the collector 60 of the transistor 55 for the same reason. It is understood that, in certain installations wherein the subject invention finds utility, the use of the diodes described herein may not be necessary.

In operation, the ignition switch 10, illustrated in FIGURE 1, is positioned in a well-known manner energizing the ignition, battery and accessory terminals. It should be noted that, during starting, only the ignition and battery terminals are energized, thereby deenergizing the first control means. Under these conditions, the second control means receives power from the battery 14 and the lamp 64 will become incandescent. This provides a means for checking the operability of the lamp 64 before the actual need therefor exists.

During conditions of operation after starting, when the ignition, battery and accessory terminals are energized, power is provided to the first transistor 26. The base 30 of the transistor 26 is normally biased forward or conductive by the probe 42 and the battery electrolyte when the electrolyte covers the tip 48 of the probe 42. As long as the conductive path in the base circuit provided by the electrolyte is continued, the transistor 26 is conductive and the potential at the collector 32 of the transistor 26 will be provided at the base 58 of the transistor 55. This potential being greater than the potential at the emitter 57 of the transistor 55, the transistor 55 will be non-conductive. Under this operating condition, the lamp 64 will remain dark and the vehicle operator will therefore be assured that the electrolyte level in the battery 14 is sufficiently high to prevent damage to the battery. It should be noted that the lamp 64 is located at a point in the driving compartment of the vehicle where it is visible to the vehicle operator.

If the electrolyte level in the battery 14 drops below the tip 48 of the probe 42, the circuit to the base 30 of the transistor 26 will be interrupted, thereby making the transistor 26 non-conductive. Under these conditions, the base 58 of the transistor 55 no longer receives a potential through the leads from the collector 32 of the transistor 26. The path for current flow will then be from the ignition terminal 54 through the lead 52 to the transistor 55. The lamp 64 will thereby be energized and caused to become incandescent. The vehicle operator will therefore be apprised of the fact that the electrolyte level has dropped below the tip 48 of the probe 42 and therefore is below the minimum acceptable level. Steps can then be taken by the vehicle operator to correct the problem in the battery 14.

As previously stated, the diodes 72, 74 and 76 are provided to dampen or effectively block voltage surges that are sometimes present in vehicle electrical circuits caused, for example, by voltage collapse in the field windings of electric motors. It is understood that the transients described herein can be caused by other factors.

The capacitor 68 is provided in the base circuit of the transistor 26 in order to prevent erroneous indications of low electrolyte level that are caused by the exposure of the tip 48 of the probe 42 when the electrolyte sloshes in the battery while the vehicle traverses uneven terrain. This capacitor 68 would typically be of a value allowing a two to three second delay in the lighting of the indicating lamp 64. This problem becomes accentuated when the electrolyte level is low but not below the minimum acceptable level.

It is obvious that the utility of the present invention can be extended into any environment wherein the level of a conductive fluid is to be monitored. The electrolyte of a battery is an ideal environment in that power is provided for operation of the invention from the same source that the level to be monitored is found. Another obvious use for the subject invention would be to monitor the water level in a container where power for operation of the circuit is provided by a source external to the water container.

While the embodiment of the present invention, as herein disclosed, constitutes a preferred form, it is to be understood that other forms might be adopted.

What is claimed is as follows:

1. A fluid level indicator for a storage battery adapted for use with vehicles, said fluid level indicator comprising: an ignition switch with a power terminal in conductive relationship with the battery and with accessory and ignition terminals; first control means including a transistor normally conductive and being in conductive relationship with the accessory terminal and ground, said first control means including a probe disposed in a cell of the battery to a depth corresponding to the minimum acceptable level of the electrolyte contained in the cell; second control means including a transistor normally non-conductive and conductively disposed between said ignition terminal and a lamp, said transistor in the second control means being driven conductive by an interruption of current flow in the first control means due to the electrolyte level in the battery dropping below a minimum acceptable level thereby lighting the lamp.

2. A fluid level indicator for monitoring the electrolyte level in a battery adapted for use with motor vehicles, said fluid level indicator comprising: an ignition switch having a power terminal conductively engaging the battery and being grounded therethrough, an ignition terminal, and an accessory terminal; a first electrical circuit including a probe disposed in the battery to a depth determined to be the minimum acceptable electrolyte level and a normally conductive transistor, said circuit establishing a conductive path between the accessory terminal of the ignition switch to ground, said transistor having a base in conductive relationship with said probe; and a second electrical circuit including a load, a transistor, and a lamp, said second electrical circuit establishing a conductive path between the ignition terminal of the ignition switch and ground, the base of the transistor in said second electrical circuit being at the same electrical potential as the collector of the transistor in the first electrical circuit, said second electrical circuit through said lamp being made conductive when the transistor in said first electrical circuit becomes non-conductive due to electrolyte level in the battery falling below the end of the probe disposed therein.

3. A fluid level indicator according to claim 2 wherein diodes are conductively disposed between the accessory terminal and the transistor of the first electrical circuit and between the ignition terminal and the transistor of the second electrical circuit.

4. A fluid level indicator according to claim 3 wherein a diode is conductively disposed between the transistor of the second electrical circuit and the lamp of the second electrical circuit.

5. A fluid level indicator according to claim 2 wherein the probe of the first electrical circuit is carried suspended with respect to the electrolyte in the battery by a battery filler cap.

6. A fluid level indicator for monitoring the electrolyte level of a storage battery adapted for use with motor vehicles, said fluid level indicator comprising: an ignition switch having a power terminal in conductive relationship to a grounded battery, an accesary terminal, and an ignition terminal; a first control circuit including an emitter of a transistor in conductive relationship with the accessory terminal, the base of the transistor having a load and a conductive lead to the battery, a probe suspended in the battery to a depth equal to the minimum acceptable level of electrolyte and being in conductive relationship with the lead from the base of said transistor, and a load conductively disposed between the collector of the transistor and ground; and a second control circuit establishing a conductive path between said ignition terminal and ground, said second control circuit comprising a lead having a load, a transistor the emitter of which is in conductive relationship with said load, the base of which is at the same potential as the collector of the transistor of said first control circuit, and the collector of which is grounded through a lamp, the transistor of said first control circuit being normally conductive when the probe completes an electrical circuit to the base of said transistor through the battery, the transistor of said second control circuit being non-conductive when the electrolyte level is above the minimum acceptable level due to the common polarity of the collector of the transistor of the first control circuit and the base of the transistor of said second control circuit, the transistor of said second control circuit being made conductive to light the lamp when the electrolyte level in the battery drops below the suspended probe thereby making the transistor of said first control circuit non-conductive.

References Cited

UNITED STATES PATENTS

| | | | |
|---|---|---|---|
| 2,828,450 | 3/1958 | Pinckaers | 317—148.5 |
| 2,836,808 | 5/1958 | Walker | 340—249 |
| 3,314,060 | 4/1967 | MacKenzie et al. | 340—244 |
| 3,350,619 | 10/1967 | Jensen | 320—32 |

JOHN W. CALDWELL, *Primary Examiner.*

D. M. MYER, *Assistant Examiner.*

U.S. Cl. X.R.

340—244, 249